United States Patent
Sakata et al.

(10) Patent No.: US 10,142,181 B2
(45) Date of Patent: Nov. 27, 2018

(54) METHOD AND APPARATUS FOR TEMPLATE BASED PLATFORM AND INFRASTRUCTURE PROVISIONING

(71) Applicant: HITACHI, LTD., Tokyo (JP)

(72) Inventors: Masayuki Sakata, Tokyo (JP); Akshay Rao, Kirkland, WA (US); Akihisa Nagami, Tokyo (JP); Utkarsh Jeevanlal Shah, Redmond, WA (US); Nicklas Daniel Drochak, II, Issaquah, WA (US)

(73) Assignee: HITACHI, LTD., Tokyo (JP)

( * ) Notice: Subject to any disclaimer, the term of this patent is extended or adjusted under 35 U.S.C. 154(b) by 108 days.

(21) Appl. No.: 15/117,436

(22) PCT Filed: Apr. 18, 2014

(86) PCT No.: PCT/US2014/034705
§ 371 (c)(1),
(2) Date: Aug. 8, 2016

(87) PCT Pub. No.: WO2015/160366
PCT Pub. Date: Oct. 22, 2015

(65) Prior Publication Data
US 2016/0373301 A1 Dec. 22, 2016

(51) Int. Cl.
*G06F 15/177* (2006.01)
*H04L 12/24* (2006.01)
(Continued)

(52) U.S. Cl.
CPC ........... *H04L 41/0843* (2013.01); *G06F 8/60* (2013.01); *G06F 9/44505* (2013.01); *H04L 67/30* (2013.01); *H04L 67/1097* (2013.01)

(58) Field of Classification Search
None
See application file for complete search history.

(56) References Cited

U.S. PATENT DOCUMENTS

2003/0005119 A1* 1/2003 Mercier .............. G06F 3/0601
709/225
2006/0092861 A1* 5/2006 Corday .............. H04L 41/0213
370/256
(Continued)

FOREIGN PATENT DOCUMENTS

JP 2011003208 A 1/2011
JP 2013037593 A 2/2013
(Continued)

OTHER PUBLICATIONS

International Search Report and Written Opinion for PCT App No. PCT/US2014/034705 dated Sep. 22, 2014, 12 pgs.
(Continued)

*Primary Examiner* — June Y Sison
*Assistant Examiner* — Dixon F Dabipi
(74) *Attorney, Agent, or Firm* — Procopio, Cory, Hargreaves & Savitch LLP

(57) ABSTRACT

Systems and methods described herein are directed to a template based deployment system providing settings across platform and physical infrastructures. The infrastructure can involve a server, storage, and a network. The platform can include various types of operating systems. A management server may be configured to manage various system elements, server virtualization and platform deployment. The management server may use policies based on a platform template, server profile, host storage profile, and host network profile. Infrastructure configurations may be determined by the management server, according to the platform type, and platform option settings in the platform template. The management server deploys the infrastructure and platform on top of the infrastructure using platform template and images.

14 Claims, 20 Drawing Sheets

(51) Int. Cl.
*G06F 8/60* (2018.01)
*G06F 9/445* (2018.01)
*H04L 29/08* (2006.01)

(56) References Cited

U.S. PATENT DOCUMENTS

| | | | |
|---|---|---|---|
| 2010/0100611 A1* | 4/2010 | Hatasaki | G06F 13/00 |
| | | | 709/221 |
| 2010/0169860 A1* | 7/2010 | Biazetti | H04L 41/0806 |
| | | | 717/107 |
| 2013/0041992 A1 | 2/2013 | Watanabe | |
| 2013/0254521 A1* | 9/2013 | Bealkowski | G06F 9/445 |
| | | | 713/2 |

FOREIGN PATENT DOCUMENTS

| | | | | |
|---|---|---|---|---|
| JP | 2013131134 A | | 7/2013 | |
| WO | 2013022619 A1 | | 2/2013 | |
| WO | 2013/180703 | | 5/2013 | |
| WO | PCT/US2014/034705 | * | 4/2014 | G06F 15/173 |

OTHER PUBLICATIONS

Office Action for Japan Patent Application No. JP 2016-550195 dated Jul. 4, 2017. 7 pages. Japan Patent Office.

\* cited by examiner

| Element ID | Element Type | Model | Child Element Ids |
|---|---|---|---|
| LAN Switch 1 | LAN Switch | LAN Switch C100 | LAN Switch Port 1-1, LAN Switch Port 1-2, LAN Switch Port 1-3, LAN Switch Port 1-4, LAN Switch Port 1-5, LAN Switch Port 1-6, LAN Switch Port 1-7 |
| ... | ... | | ... |
| LAN Switch Port 1-1 | LAN Switch port | N/A | |
| ... | ... | ... | ... |
| SAN Switch 1 | SAN switch | SAN Switch B200 | SAN Switch Port 1-1, SAN Switch Port 1-2, SAN Switch Port 1-3, SAN Switch Port 1-4, SAN Switch Port 1-5, SAN Switch Port 1-6, SAN Switch Port 1-7 |
| ... | ... | ... | ... |
| SAN Switch Port 1-1 | SAN Switch port | N/A | |
| ... | ... | ... | ... |
| Server 1 | server | Server H500 | Server LAN Port 1-1, Server LAN Port 1-2, Server SAN Port 1-1, Server SAN Port 1-2 |
| Server 2 | server | Server H500 | Server LAN Port 1-1, Server LAN Port 1-2, Server SAN Port 1-1, Server SAN Port 1-2 |
| ... | ... | ... | ... |
| Server LAN Port 1-1 | server LAN port | NIC E100 | |
| ... | ... | ... | ... |
| Server SAN Port 1-1 | server SAN port | HBA E200 | |
| ... | ... | ... | ... |
| Storage System 1 | storage system | Storage Array H800 | Storage controller 1, Storage Controller 2 |
| ... | ... | ... | ... |
| Storage Controller 1 | Storage Controller | N/A | Storage Port 1-1, Storage Port 1-3, Storage Port 1-4 |
| ... | ... | ... | ... |

FIG. 3

| Connection Id | Element Id 1 | Element Id 2 |
|---|---|---|
| 1 | Server LAN Port 1-1 | LAN Switch Port 1-1 |
| 2 | Server LAN Port 1-2 | LAN Switch Port 2-1 |
| ... | ... | ... |
| 13 | Server SAN Port 1-1 | SAN Switch Port 1-1 |
| 14 | Server SAN Port 1-2 | SAN Switch Port 2-1 |
| ... | ... | ... |
| 25 | Storage Port 1-1 | SAN Switch Port 1-3 |
| 26 | Storage Port 1-2 | SAN Switch Port 2-3 |
| ... | ... | ... |

FIG. 4

| # | Platform Image Name | Platform Type | Image File | Silent Installation File | Platform Optional Settings |
|---|---|---|---|---|---|
| 1 | Platform A Enterprise 2012 | Platform A | \\image\platform_A\ 2012\image.iso | \\image\platform_A\ 2012\ Enterprise_kikstart.txt | • User Name [] <br> • Password [] <br> • Domain Join [Enable/ Disable] <br> • Network VLAN ID [] <br> • Storage Volume [] |
| 2 | Platform B Virtualization 2014 | Platform B | \\image\platform_B\ 2014\image.iso | \\image\platform_B\ 2014\ virtualization_kikstart.txt | • Cluster [Enable/Disable] <br> • Boot Type [Stateless/ Stateful] <br> • LAN Port Partitioning [Enable/Disable] <br> • Network VLAN ID for Management [] <br> • Network VLAN ID for Migration [] <br> • Network VLAN IDs for Applications[] <br> • Virtual-Physical Network Sync [Enable/Disable] <br> • Storage Volume [] <br> • Storage Dynamic Load Balance [Enable/Disable] |
| 3 | Platform C Standard 2013 | Platform C | \\image\platform_C\ Standard\2011\ image.iso | \\image\platform_C\ 2013\ standard_kikstart.txt | • User Name [] <br> • Password [] <br> • Network VLAN ID [] <br> • Storage Volume [] |
| 4 | Platform C Enterprise 2013 | Platform C | \\image\platform_C\ Enterprise\2013\ image.iso | \\image\platform_C\ 2013\ enterprise_kikstart.txt | • User Name [] <br> • Password [] <br> • Cluster [Enable/Disable] <br> • Network VLAN ID [] <br> • Storage Volume [] |
| ... | ... | ... | ... | ... | ... |

FIG. 5

| # | Template Name | Platform Image | Platform Type | Platform Optional Settings |
|---|---|---|---|---|
| 1 | Platform for Web Server | 1 | Platform A | <ul><li>User Name [admin]</li><li>Password [password12345]</li><li>Domain Join [Enable]</li><li>Network VLAN ID [100]</li><li>Storage Volume [(100GB (Bronze, Boot), 200GB (Silver)]</li></ul> |
| 2 | Standard Virtualization Host | 2 | Platform B | <ul><li>Cluster [Disable]</li><li>Boot Type [Stateful]</li><li>LAN Port Partitioning [Enable]</li><li>Network VLAN ID for Management [10]</li><li>Network VLAN ID for Migration [20]</li><li>Network VLAN IDs for Applications [30-40]</li><li>Networks for Applications [ {Name: "Web Server VM Net", VLAN ID:30-40, Bandwidth:30%}, {Name: "DB Server VM Net", VLAN ID:50-60, Bandwidth:40%}]</li><li>Storage Volume [(100GB (Bronze, Boot), 200GB (Silver))]</li><li>Storage Dynamic Load Balance [Disable]</li></ul> |
| 3 | High Available Virtualization Host | 2 | Platform B | <ul><li>Cluster [Enable]</li><li>Boot Types [Stateless]</li><li>Network VLAN ID for Management[10]</li><li>Network VLAN IDs for Migration [20]</li><li>Network VLAN IDs for Applications [30-40]</li><li>Storage Volume [(500GB (Gold, Backup)]</li><li>Storage Dynamic Load Balance [Enable]</li></ul> |
| 4 | Platform for Database Cluster | 4 | Platform C | <ul><li>User Name [admin]</li><li>Password [password12345]</li><li>Cluster [Enable]</li><li>Network VLAN ID [200]</li><li>Storage Volume [(100GB (Bronze, Boot), 200GB (Gold, Backup))]</li></ul> |
| ... | ... | ... | ... | ... |

FIG. 6

| # | Server Model | Platform Type | EFI settings |
|---|---|---|---|
| 1 | Server H500 | Platform A | • Processor Turbo Mode [Disable]<br>• Processor Virtualization Support [Disable]<br>• Processor Hyper-Threading [Enable]<br>• Memory Speed [Force DDR3 1600]<br>• Memory Voltage Level [1.5V] |
| 2 | Server H500 | Platform B | • Processor Turbo Mode [Disable]<br>• Processor Virtualization Support [Enable]<br>• Processor Hyper-Threading [Enable]<br>• Memory Speed [Force DDR3 1600]<br>• Memory Voltage Level [1.5V] |
| ... | ... | ... | ... |
| 4 | Server H520 | Platform A | • Processor Turbo Mode [Disable]<br>• Processor Virtualization Support [Disable]<br>• Processor Hyper-Threading [Enable]<br>• Memory HA mode [Enable]<br>• Memory Speed [Force DDR3 1600]<br>• Memory Voltage Level [1.5V] |
| 5 | Server H520 | Platform B | • Processor Turbo Mode [Disable]<br>• Processor Virtualization Support [Disable]<br>• Processor Hyper-Threading [Enable]<br>• Memory HA mode [Enable]<br>• Memory Speed [Force DDR3 1600]<br>• Memory Voltage Level [1.5V] |
| ... | ... | ... | ... |

FIG. 7

| # | Platform Type | Platform Optional Settings | Boot Option |
|---|---|---|---|
| 1 | Platform A | | SAN Boot |
| 2 | Platform B | Boot Type [Stateless] | PXE Boot |
| 3 | Platform B | Boot Type [Stateful] | SAN Boot |
| 4 | Platform C | | SAN Boot |
| ... | ... | ... | ... |

FIG. 8

| # | MAC Address | Status | Server Profile |
|---|---|---|---|
| 1 | dd:aa:bb:01:01:00 | Assigned | 1 |
| 2 | dd:aa:bb:01:01:01 | Assigned | 1 |
| 3 | dd:aa:bb:01:01:02 | Assigned | 2 |
| 4 | dd:aa:bb:01:01:03 | Assigned | 2 |
| 5 | dd:aa:bb:01:01:04 | Not Assigned | |
| 5 | dd:aa:bb:01:01:05 | Not Assigned | |
| ... | ... | ... | ... |

FIG. 9

| # | WWN | Status | Server Profile |
|---|---|---|---|
| 1 | 24:aa:bb:cc:01:01:01:00 | Assigned | 1 |
| 2 | 24:aa:bb:cc:01:01:01:01 | Assigned | 1 |
| 3 | 24:aa:bb:cc:01:01:01:02 | Assigned | 2 |
| 4 | 24:aa:bb:cc:01:01:01:03 | Assigned | 2 |
| 5 | 24:aa:bb:cc:01:01:01:04 | Not Assigned | |
| 5 | 24:aa:bb:cc:01:01:01:05 | Not Assigned | |
| ... | ... | ... | ... |

FIG. 10

| # | Platform Template Id | Server Element Id | LAN Port | LAN Port Partition | VLAN ID | Bandwidth | MAC Address | SAN Port | WWN | Boot Option | EFI Settings |
|---|---|---|---|---|---|---|---|---|---|---|---|
| 1 | 1 | Server 1 | Server LAN Port 1-1 | - | 100 | 100% | dd:aa:bb:01:01:01 | Server SAN Port 1-1 | 24:aa:bb:cc:01:01:01:00 | | • Processor Turbo Mode [Disable]<br>• Processor Virtualization Support [Disable]<br>• Processor Hyper-Threading [Enable]<br>• Memory Speed [Force DDR3 1600]<br>• Memory Voltage Level [1.5V] |
| | | | Server LAN Port 1-2 | - | 100 | 100% | dd:a:bb:01:01:01 | Server SAN Port 1-2 | 24:aa:bb:cc:01:01:01:01 | SAN Booting | |
| 2 | 3 | Server 2 | Server LAN Port 2-1 | Partition 2-1-1 | 10 | 10% | dd:aa:bb:01:01:10 | Server SAN Port 2-1 | 24:aa:bb:cc:01:01:01:02 | | • Processor Turbo Mode [Disable]<br>• Processor Virtualization Support [Disable]<br>• Processor Hyper-Threading [Enable]<br>• Memory HA mode [Enable]<br>• Memory Speed [Force DDR3 1600]<br>• Memory Voltage Level [1.5V] |
| | | | | Partition 2-1-2 | 20 | 20% | dd:aa:bb:01:01:11 | | | | |
| | | | | Partition 2-1-3 | 30-40 | 30% | dd:aa:bb:01:01:12 | | | | |
| | | | | Partition 2-1-4 | 50-60 | 40% | dd:aa:bb:01:01:13 | | | | |
| | | | Server LAN Port 2-2 | Partition 2-2-1 | 10 | 10% | dd:aa:bb:01:01:14 | Server SAN Port 2-2 | 24:aa:bb:cc:01:01:01:03 | PXE Booting | |
| | | | | Partition 2-2-2 | 20 | | dd:aa:bb:01:01:15 | | | | |
| | | | | Partition 2-2-3 | 30-40 | 30% | dd:aa:bb:01:01:16 | | | | |
| | | | | Partition 2-2-4 | 50-60 | 40% | dd:aa:bb:01:01:17 | | | | |

FIG. 11

| # | Storage Model | Platform Type | Platform Optional Settings | Host Group Setting | Host Group Optional Settings |
|---|---|---|---|---|---|
| 1 | Storage Array H800 | Platform A | | Platform A mode | Enable ODX<br>Enable Capacity Expansion |
| 2 | Storage Array H800 | Platform B | Cluster [Enabled] | Platform B mode | Enable ODX<br>Enable Capacity Expansion<br>Enable Cluster Access |
| 3 | Storage Array H800 | Platform B | Cluster [Disabled] | Platform B mode | Enable ODX<br>Enable Capacity Expansion |
| 4 | Storage Array H800 | Platform C | | Standard mode | Enable Capacity Expansion |
| 5 | Storage Array H700 | Platform A | | Standard mode | - |
| 6 | Storage Array H700 | Platform B | Cluster [Enabled] | Platform B Extension mode | - |
| 7 | Storage Array H700 | Platform B | Cluster [Enabled] | Platform B mode | - |
| 8 | Storage Array H700 | Platform C | | Standard mode | - |

FIG. 12

| # | Pool Name | Storage System | Storage Model | Class | Platform Type | Storage Volume Options | Free Size |
|---|---|---|---|---|---|---|---|
| 1 | SSD Pool Gold | Storage System 1 | Storage Array H800 | Gold | Any | Backup | 5TB |
| 2 | SSD Pool Silver | Storage System 1 | Storage Array H800 | Silver | Any | Boot, Backup | 10TB |
| 3 | SSD Pool Bronze | Storage System 1 | Storage Array H800 | Silver | Any | Boot, Backup | 10TB |
| 4 | SSD Pool Silver | Storage System 2 | Storage Array H700 | Silver | Platform A or Platform C | Boot | 5TB |
| 5 | HDD Pool Bronze | Storage System 2 | Storage Array H700 | Bronze | Platform A or Platform C | Boot | 10TB |
| ... | ... | ... | ... | | | | |

FIG. 13

| # | Platform Template Id | Server Profile Id | Volume Size | Class | Storage Volume Options | Storage Pool | Volume Id | Host Group Setting | Host Group Optional Settings |
|---|---|---|---|---|---|---|---|---|---|
| 1 | 1 | 1 | 100GB | Bronze | Boot | 5 | 00:00:01 | Standard mode | - |
| | | | 200GB | Silver | | 2 | 00:00:02 | Platform A mode | Enable ODX<br>Enable Capacity Expansion |
| 2 | 3 | 1 | 500GB | Gold | Backup | 1 | 00:00:01 | Platform B mode | Enable ODX<br>Enable Capacity Expansion<br>Enable Cluster Access |
| ... | ... | ... | ... | ... | ... | ... | ... | ... | ... |

FIG. 14

| # | LAN Switch Model | Platform Type | Platform Optional Settings | VLAN Mode | Priority | Virtual-Physical Network Sync |
|---|---|---|---|---|---|---|
| 1 | LAN Switch C100 | Platform A | | Access VLAN mode | Middle | Disable |
| 2 | LAN Switch C100 | Platform B | Boot type [Stateless] LAN Port Partitioning (Enable) | Trunk VLAN mode for Management Trunk VLAN mode for Migration Trunk VLAN mode for Application | High for Management Low for Migration Middle for Application | Disable for Management Disable for Migration Disable for Application |
| 3 | LAN Switch C100 | Platform B | Boot type [Stateless] LAN Port Partitioning (Disable) | Native VLAN mode for Management Trunk VLAN mode for Migration Trunk VLAN mode for Application | High for Management Low for Migration Middle for Application | Disable for Management Disable for Migration Disable for Application |
| 4 | LAN Switch C100 | Platform B | Boot Type (Stateful) | Trunk VLAN mode for Management Trunk VLAN mode for Migration Trunk VLAN mode for Application | High for Management Low for Migration Middle for Application | Disable for Management Disable for Migration Disable for Application |
| 5 | LAN Switch C100 | Platform C | | | Middle | Disable |
| ... | ... | ... | ... | ... | ... | ... |

FIG. 15

| # | Platform Template Id | Server Profile Id | VLAN Id | VLAN Mode | Priority | Virtual – Physical Network Sync |
|---|---|---|---|---|---|---|
| 1 | 1 | 1 | 100 | Access VLAN mode | Middle | Disable |
| 2 | 3 | 1 | 10 (Management) | Native VLAN mode | High | Disable |
| | | | 20 (Migration) | Trunk VLAN mode | Low | Disable |
| | | | 30-40 (Application) | Trunk VLAN mode | Middle | Enable |
| ... | ... | ... | ... | ... | ... | ... |

FIG. 16

Platform B Virtualization 2014 Optional Settings

Cluster : Enable ⊗  Disable ○

Boot Type : Stateless ○ Stateful ⊗

LAN Port Partitioning : Enable ⊗  Disable ○

Networks (Virtual Switch) Setting

| Networks | VLAN ID | Bandwidth (%) |
|---|---|---|
| Management | 10 | 10 |
| Migration | 20 | 20 |
| Web Server VM Net | 30-40 | 30 |
| DB Server VM Net | 50-60 | 40 |

Add Network

Storage Volume :

| Volume Size (GB) | Class (Gold, Silver, Bronze) | Boot | Backup |
|---|---|---|---|
| 100 | Bronze | Enable | Disable |
| 200 | Silver | Disable | Enable |

Add Volume

Storage Dynamic Load Balance : Enable ⊗  Disable ○

OK  Cancel

FIG. 25

METHOD AND APPARATUS FOR TEMPLATE BASED PLATFORM AND INFRASTRUCTURE PROVISIONING

CROSS-REFERENCE TO RELATED APPLICATIONS

This application is a U.S. National Stage entry of PCT Application No. PCT/US2014/034705, filed on Apr. 18, 2014, the contents of which are incorporated by reference.

BACKGROUND

Field

The present disclosure is generally directed to a computer system having a host computer, a storage subsystem, a network system, and a management computer and, more particularly, to platform provisioning on the computer system.

Related Art

In the field of Information Technology (IT), there has been an increase in the size and complexity of the platform system and the computer system. Moreover, software development methods based on iterative and incremental development (called "Agile Software Development") has rendered the lifecycle of the application system shorter. As a result, the amount of work of the IT administrator has increased, especially for system deployment.

To reduce the deployment work for the IT administrator, there are some tools which enable template-based provisioning technologies. By using these tools, the IT administrator can deploy the platform or physical infrastructure recursively. In the related art IT system, there are several IT administrators who have a responsibility for specific parts of the system. For example, the Platform Administrator manages platforms such as the Operating System (OS), and the Middleware. The Infrastructure Administrator manages the physical infrastructure such as the server, storage, and network switch.

To deploy the heterogeneous types of platforms on the computer system, the infrastructure administrator may need to know the requirements for the physical infrastructures before the platform administrator deploys the platforms.

SUMMARY

Aspects of the present disclosure include a management server configured to manage a plurality of computer devices. The management server may involve a memory configured to store a plurality of templates, each of the plurality of templates indicative of a software that is executable by at least one of the plurality of computer devices, and management information that includes a configuration policy for a set of one or more of the plurality of devices and a software property. The management server may also include a processor, configured to create a computer device profile from a request comprising a selection of one of the plurality of templates and a selection of one of the plurality of computer devices based on the management information; and apply the computer device profile to the selected one of the plurality of computer devices to configure the selected one of the plurality of computer devices.

Aspects of the present application further include a computer program for a management server configured to manage a plurality of computer devices, the computer program including instructions for executing a process. The instructions may involve managing a plurality of templates, each of the plurality of templates indicative of a software that is executable by at least one server, and management information for a configuration policy for a set one or more of the plurality of devices and a software property. Instructions may further include creating a computer device profile from a request comprising a selection of one of the plurality of templates and a selection of one of the plurality of computer devices based on the management information; and applying the computer device profile to the selected one of the plurality of computer devices to configure the selected one of the plurality of computer devices.

BRIEF DESCRIPTION OF DRAWINGS

FIG. 3 illustrates an example of the System Element Table, in accordance with an example implementation.

FIG. 4 shows an example of the Connectivity Table, in accordance with an example implementation.

FIG. 5 shows an example of the Platform Image Table, in accordance with an example implementation.

FIG. 6 shows an example of the Platform Template Table, in accordance with an example implementation.

FIG. 7 shows an example of the Server EFI Setting Table, in accordance with an example implementation.

FIG. 8 shows an example of the Boot Option Table, in accordance with an example implementation.

FIG. 9 shows an example of the MAC Address Pool Table, in accordance with an example implementation.

FIG. 10 shows an example of the WWN Pool Table, in accordance with an example implementation.

FIG. 11 shows an example of the Server Profile Table, in accordance with an example implementation.

FIG. 12 shows an example of the Storage Host Group Table, in accordance with an example implementation.

FIG. 13 shows an example of the Storage Pool Table, in accordance with an example implementation.

FIG. 14 shows an example of the Host Storage Profile Table, in accordance with an example implementation.

FIG. 15 shows an example of the Network Connection Mode Table, in accordance with an example implementation.

FIG. 16 shows an example of the Host Network Profile Table, in accordance with an example implementation.

FIGS. 23 to 25 illustrate example graphical user interfaces (GUI), in accordance with an example implementation.

DETAILED DESCRIPTION

Figure 1:
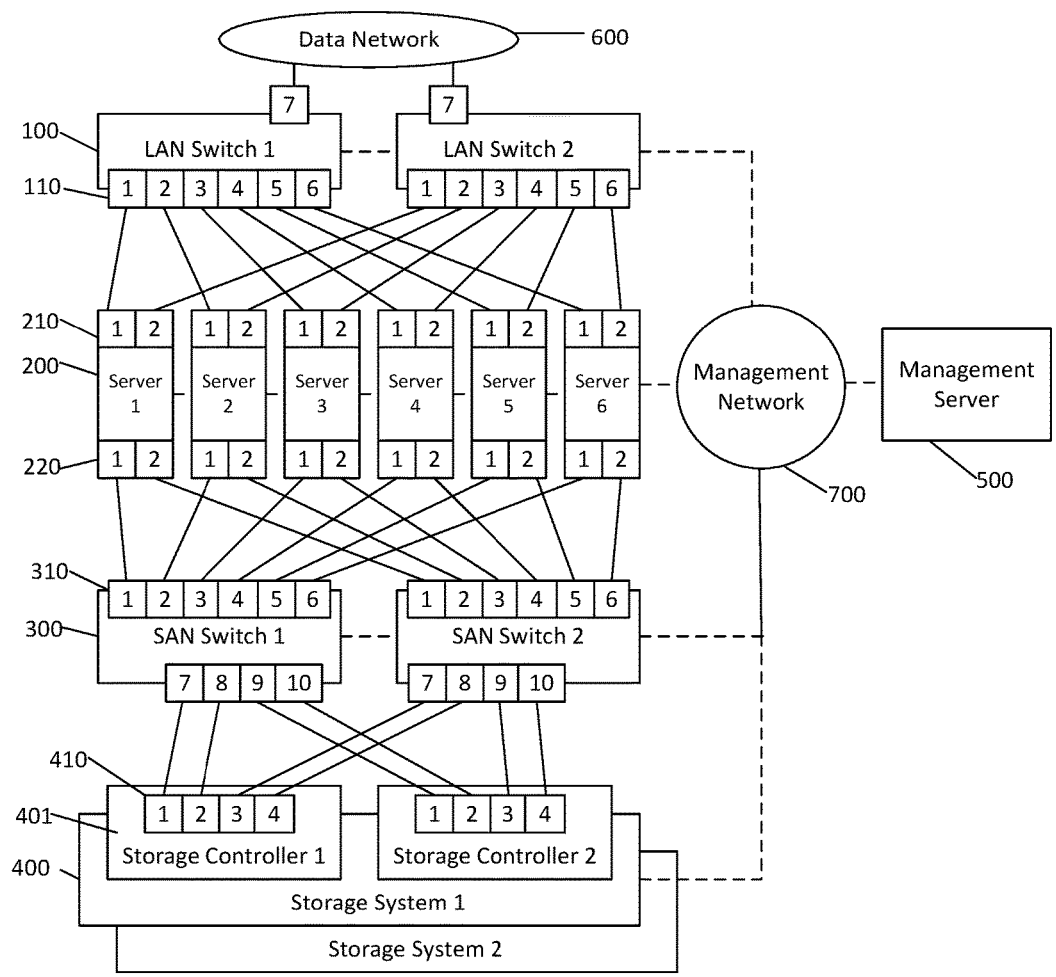
FIG. 1 illustrates an example of a computer system configuration in which the method and apparatus of the example implementations may be applied.

The following detailed description provides further details of the figures and example implementations of the present application. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing implementations of the present application.

The subject matter herein is described using example implementations and is not limited to the example implementations. In actual implementations, there may be fewer, more, or different components, acts, and/or elements as described in an example implementation. In the form of a process or method (e.g., a computer, device, or system implemented process), actual implementations may include fewer, more, or different operations or operations in orders different from that described in a process.

As the infrastructure administrator may need to know the requirements for the physical infrastructures before the platform administrator deploys the platforms, some problems may arise. For example, there may be a need for a hand over between the platform administrator and the infrastructure admin, which may cause an operation miss. Due to the coordination, the platform deployment may take considerable time. Further, there is a potential for a misconfiguration caused by the lack of having accurate physical and platform mapping information.

Example implementations may resolve such issues by providing systems and methods for applying manageable settings across platform and physical infrastructures while maintaining consistency.

In example implementations, there is an infrastructure and platform provisioning method using platform template and infrastructure profiles. Infrastructure configurations may be determined by the management server, according to the platform type and the platform option settings in the platform template. Then, the management server deploys the infrastructure and platform on top of the infrastructure by using platform template and images.

FIG. 1 illustrates an example of a computer system configuration in which the method and apparatus of the example implementations may be applied. The computer system may include LAN (Local Area network) switch 100, LAN switch port 110, server 200, server LAN port 210, server SAN (Storage Area Network) port 220, SAN switch 300, SAN switch port 310, storage system 400, storage controller 401, storage port 410, management server 500, data network 600 and management network 700. The management server is configured to manage computer devices such as servers, networks, storage devices, and so forth.

In this example, the computer system involves two LAN switches 100 (LAN Switch 1, 2), two SAN switches 300 (SAN Switch 1, 2), six servers 200 (Server 1-6), two storage systems 400 (Storage System1, 2) and one Management Server 500 (Management Server). Each storage system 400 has two storage controllers 401. Each server 200 has two LAN switch ports 210 and two SAN switch ports 220. Further, each server 200 is connected to two LAN switches 100 and two SAN switches via LAN switch ports 210 and SAN switch ports 220 to improve redundancy. For example, if failure occurs at SAN Switch 1, Server 1 can keep communicating to Storage System 400 via SAN Switch 2.

Figure 2:
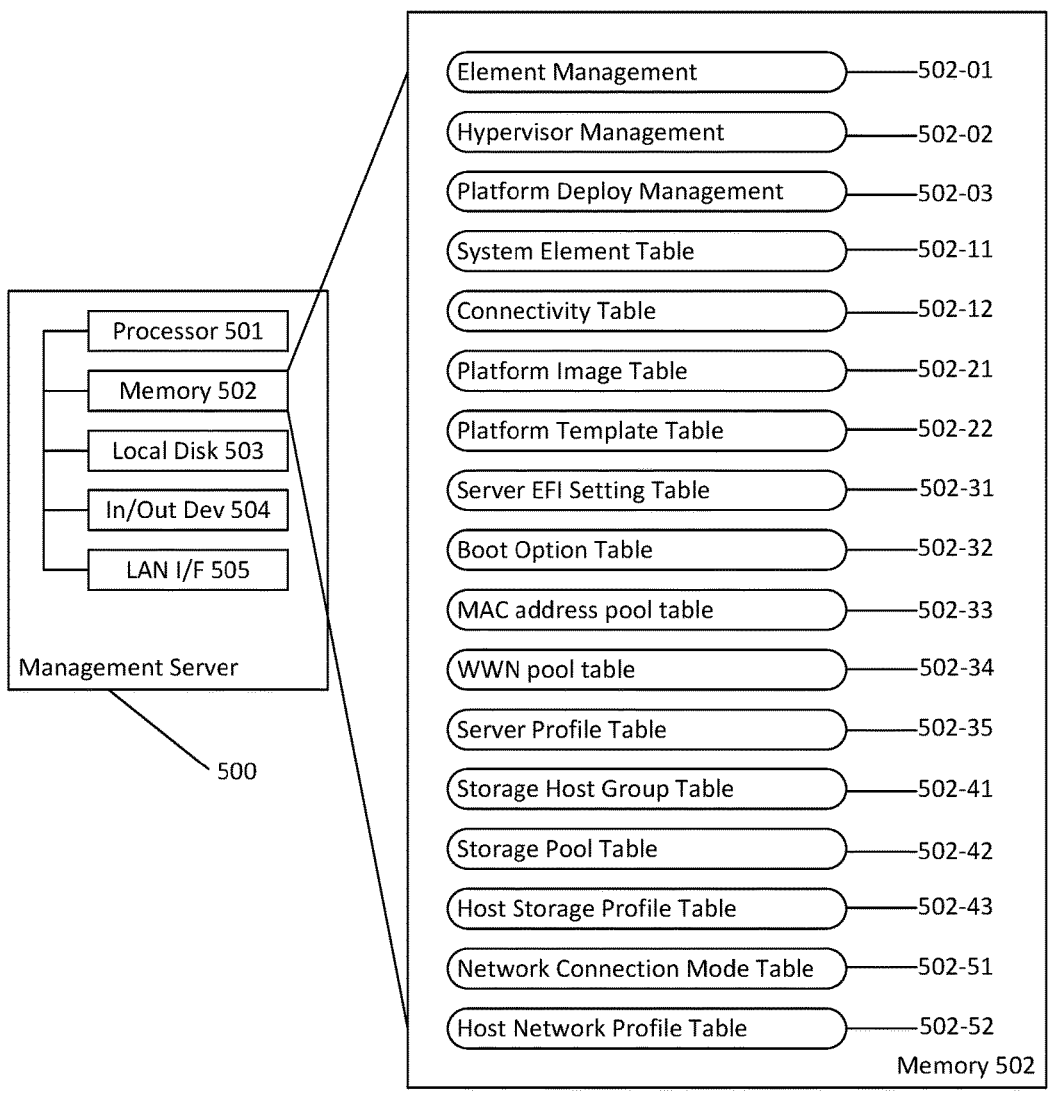
FIG. 2 illustrates an example of a module configuration of a management server, in accordance with an example implementation.

FIG. 2 illustrates an example of a module configuration of a management server 500, in accordance with an example implementation. Management server 500 may include processor 501, memory 502, local disk 503, input/output device (In/Out Dev) 504 and LAN Interface 505. In/Out Dev 505 may be a user interface such as a monitor, keyboard, and mouse which the system administrator uses. Depending on the desired implementation, Management Server 500 may be a physical host, and/or a virtual host such as a virtual machine. Further, management Server 500 may be configured to utilize several physical or virtual hosts.

FIG. 2 also shows an example of a software module configuration of the memory 502 according to an example implementation. The software module configuration of the memory 502 may include Element Management 502-01, Hypervisor Management 502-02, Platform Deploy Management 502-03, System Element Table 502-11, Connectivity Table 502-12, Platform Image Table 502-21, Platform Template Table 502-22, Server Extensible Firmware Interface (EFI) Setting Table, Boot Option Table 502-32, MAC (Media Access Control) Address Pool Table 502-33, WWN (World Wide Name) Pool Table 502-34, Server Profile Table 502-35, Storage Host Group Table 502-41, Storage Pool Table 502-42, Host Storage Profile Table 502-43, Network Connection Mode Table 502-51, and Host Network Profile Table 502-52. Further details for each of the tables and management are provided below.

Management server 500 may be configured to communicate with other elements in the computer system via management network 700, and is configured to provide management functions. For example, Element Management 502-01 maintains System Element Table 502-11, and Connectivity Table 502-12 to provide system configuration information to the administrators and execute system management operation such as storage volume deployment. Hypervisor Management 502-02 provides hypervisor management functionalities to the system administrator. Platform Deploy Management 502-03 provides platform deployment capability.

FIG. 3 illustrates an example of the System Element Table 502-11, in accordance with an example implementation. The "Element Id" field represents the identifiers of elements which managed by the management server 500. The "Element Type" field represents the type of element, which can include various computer devices such as server, switch and so forth. The "Model" field represents the model of the element. The "Sub Element Ids" field represents the list of identifiers of sub elements which belong to the element. For example, FIG. 3 illustrates that Server 1 has Server LAN Port 1-1, Server LAN Port 1-2, Server SAN Port 1-1 and Server SAN Port 1-2 as child elements.

FIG. 4 shows an example of the Connectivity Table 502-12, in accordance with an example implementation. This table represents the connectivity information between elements of the computer system. The "Connection Id" field represents the identifier of each connection. The "Element Id 1" and "Element Id 2" field represent the element Ids of edge elements of each connection.

FIG. 5 shows an example of the Platform Image Table 502-21, in accordance with an example implementation. This table represents the platform image information to install the platform, and related platform optional settings which the administrator can specify in the platform template. The "#" field represents the identifier of platform image record. The "Platform Image Name" field represents the name of the record. The "Platform Type" field represents the platform type (e.g. Microsoft Windows Server™, VMware vSphere ESXi™). The "Image File" field represents the location of the platform install image file. The "Silent Installation file" field represents the location of the silent installation file to automatically perform unattended platform installation and configuration. The "Platform Optional Settings" field represents the optional settings of the platform type which the administrator can select or specify the value of the settings in the platform template. The platform type may have some edition of the platform such as a "Standard" or "Enterprise" and may be installed by using the same install image file. The record "#3" and "#4" of FIG. 5 shows platform image records for different editions using a single install image file, and each record contains a respective silent installation file and platform optional settings for each edition.

FIG. 6 shows an example of the Platform Template Table 502-22, in accordance with an example implementation. This table represents reusable platform deployment information. The "#" field represents the identifier of each record. The "Template Name" field represents the name of the each template. The "Platform Image" field represents a list of identifier of the Platform Image Table record. The "Platform Type" field represents the platform type. The "Platform Optional Settings" field represents the optional settings and values.

FIG. 7 shows an example of the Server EFI Setting Table 502-31, in accordance with an example implementation. This table represents available EFI settings items and pre-defined values for each server model and platform type. The "#" field represents the identifier of each record. The "Server Model" field represents server model. The "Platform Type" field represents the platform type. The "EFT settings" field represents available EFI settings items and pre-defined values for each server models and platform types.

FIG. 8 shows an example of the Boot Option Table 502-32, in accordance with an example implementation. This table represents the server primary boot option according to the platform type and platform optional settings. The "#" field represents the identifier of each record. The "Platform Type" field represents the platform type. The "Platform Optional Settings" field represents the optional settings and values. The "Boot Option" field represents server primary boot option. If the "Platform Optional Settings" field is specified with platform optional settings and values, the record having the same value with the platform optional settings in the selected platform template will be selected.

FIG. 9 shows an example of the MAC Address Pool Table 502-33, in accordance with an example implementation. This table represents the list of MAC addresses which can be assigned to the server profile. The "#" field represents the identifier of each record. The "MAC Address" field represents the MAC address. The "Status" field represents the status of the MAC address. The value "Assigned" represents that the MAC address is already assigned to the server profile. The value "Not Assigned" represents that the MAC address is not assigned to the server profile. The "Server Profile" field represents the identifier of the assigned server profile in the Server Profile Table 502-35.

FIG. 10 shows an example of the WWN Pool Table 502-34, in accordance with an example implementation. This table represents the list of WWNs which can be assigned to the server profile. The "#" field represents the identifier of each record. The "WWN" field represents the WWN. The "Status" field represents the status of the WWN. The value "Assigned" represents that the WWN is already assigned to the server profile. The value "Not Assigned" represents that the WWN is not assigned to the server profile. The "Server Profile" field represents the identifier of the assigned server profile in the Server Profile Table 502-35.

FIG. 11 shows an example of the Server Profile Table 502-35, in accordance with an example implementation. This table represents the server settings which are applied to the server during the platform deployment process. The "#" field represents the identifier of each record. The "Platform Template Id" field represents the reference to the platform template which this server profile is created from, during platform deployment process. The "Server Element Id" field represents the server which is associated to the server profile, and the reference to the server in the System Element Table 502-11. The "MAC Address" field represents the MAC Address values which are assigned to the server profile from the MAC Address Pool table 502-33, and the reference to the Server LAN Port 210 of the server. The "WWN" field represents the WWN values which are assigned to the server profile from the WWN Pool table 502-34, and the reference to the Server SAN Port 220 of the server. The "Boot Option" field represents the primary boot option setting on the server. The "EFI Settings" field represents the EFI settings and values on the server.

FIG. 12 shows an example of the Storage Host Group Table 502-41, in accordance with an example implementation. This table represents the storage host group settings per storage type and OS image type. The "#" field represents the identifier of each record. The "Storage Model" field represents the model name of the storage product. The "Platform Type" field represents the platform type. The "Platform Optional Settings" field represents the optional settings and values. The "Host Group Setting" field represents the host group setting in the Storage System 400. The "Host Group Optional Settings" field represents the host group optional setting in the Storage System 400. These values may be different among the several types of the storage array because the values of the Host Group Settings and the Host Group Optional Settings may be a configurable value for each storage mode.

FIG. 13 shows an example of the Storage Pool Table 502-42, in accordance with an example implementation. This table represents the storage pools. The "#" field represents the identifier of each record. The "Pool Name" field represents the name of the pools. The "Storage System" field represents the Element Id of the storage system which contains the pool. The "Storage Model" field represents the model name of the storage product. The "Class" field represents the class of the storage pool. The "Platform Type" field represents the platform type. The value "Any" of the "Platform Type" field indicates that the pool can be used for any type of the platforms. The value "Any" of the "Platform Type" field means the pool can be used for any type of the platforms. If the platform type is specified in the "Platform Type" field, only the specified type of the platform can use this pool. The "Storage Volume Options" field represents the supported options of the volume on the pool. For example, if the "Backup" feature is represented in this field, it indicates that the backup feature is available on the pool. The "Free Size" field represents the unused space of the pool.

FIG. 14 shows an example of the Host Storage Profile Table 502-43, in accordance with an example implementation. This table represents the storage volume properties which are assigned to the server, and host group settings which are used for the storage ports. The "#" field represents the identifier of each record. The "Platform Template Id" field represents the reference to the platform template which this host storage profile is created from, during the platform deployment process. The "Server Profile Id" field represents the reference to the "Server Profile Id" for which the host storage profile is associated. The "Volume Size" field represents the specified size of the volume in the selected platform template. The "Class" field represents the specified class of the volume in the selected platform template. The "Storage Volume Options" field represents the specified options of the volume in the selected platform template. The "Storage Pool" field represents the selected storage pool during the platform deployment process. The "Volume Id" field represents the assigned volume identifier during the platform deployment process. The "Host Group Setting" field represents the host group setting which is determined during the platform deployment process, and is configured in the storage system. The "Host Group Optional Settings" field represents the host group optional settings which is determined during the platform deployment process, and is configured in the storage system.

FIG. 15 shows an example of the Network Connection Mode Table 502-51, in accordance with an example implementation. This table represents the LAN switch settings according to the platform type and platform optional settings. The "#" field represents the identifier of each record. The "LAN Switch Model" field represents the model name of the LAN switch product. The "Platform Type" field represents the platform type. The "Platform Optional Settings" field represents the optional settings and values. The "VLAN mode" field represents the virtual LAN (VLAN) mode for each VLAN of the port of the LAN switch which is connected to the server. The "Priority" field represents the priority of each VLAN. The "Virtual-Physical Network Sync" field represents the enablement or disablement of the network VLAN configuration synchronization feature of the port, which can be for the server virtualization environment.

FIG. 16 shows an example of the Host Network Profile Table 502-52, in accordance with an example implementation. This table represents the LAN switch and LAN switch port properties which is connected to the server. The "#" field represents the identifier of each record. The "Platform Template Id" field represents the reference to the platform template from which the host network profile is created during the platform deployment process. The "Server Profile Id" field represents the reference to the "Server Profile Id" associated with the host network profile. The "VLAN Id" field represents the specified VLAN Ids in the selected platform template. The "VLAN Mode" field represents the VLAN mode for each VLAN on the LAN switch port. The "Priority" field represents the priority of the each VLAN. The "Virtual-Physical Network Sync" field represents enablement or disablement of the network VLAN configuration synchronization feature of the port, which can be for the server virtualization environment.

Figure 17:
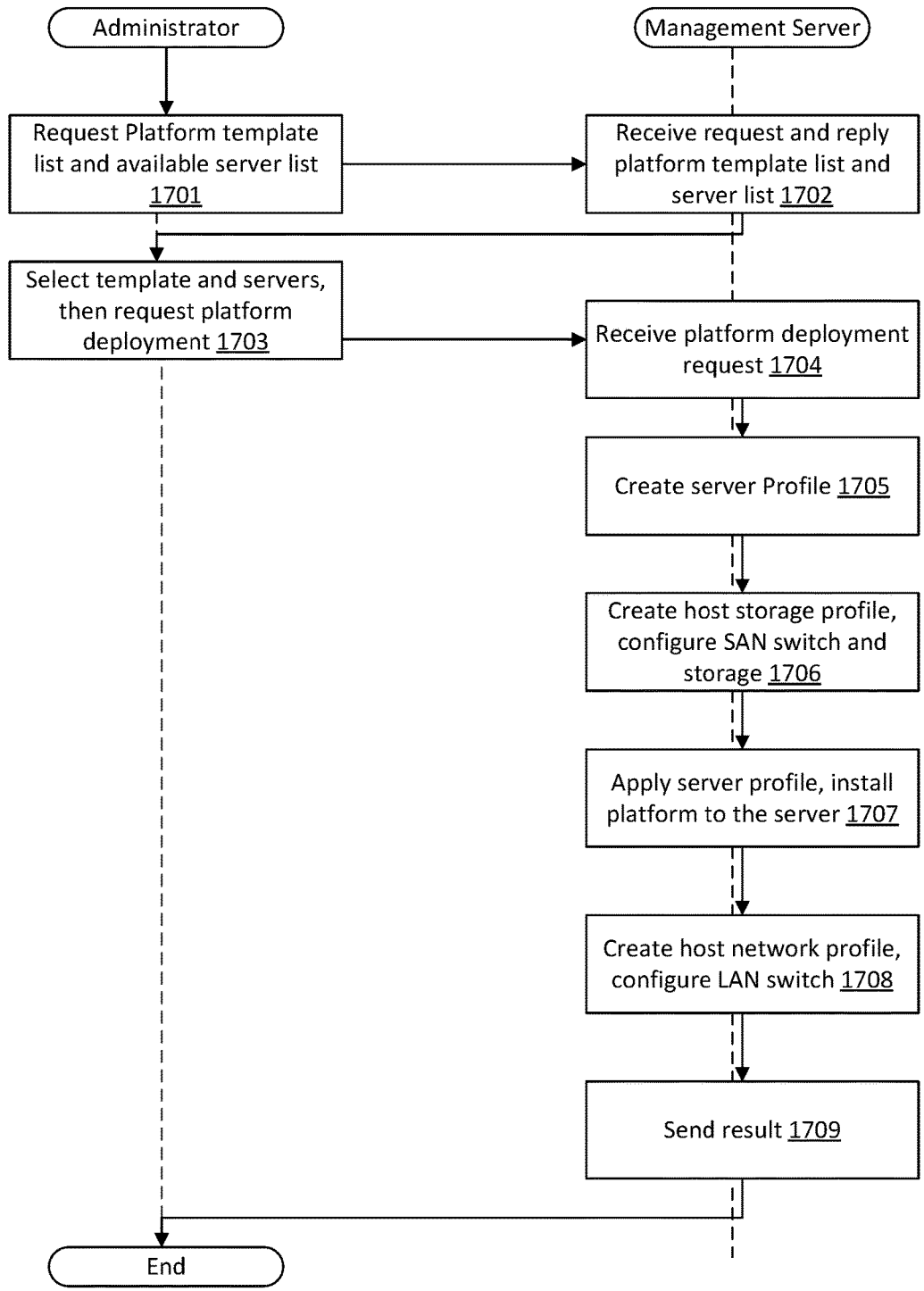
FIG. 17 is an example of a flow diagram illustrating a platform deployment operation flow as executed by the management server, in accordance with an example implementation.

FIG. 17 is an example of a flow diagram illustrating a platform deployment operation flow as executed by the management server 500, in accordance with an example implementation.

At 1701, an administrator requests the platform template list and available server list from the management server 500.

At 1702, the management server 500 receives the request from the administrator. Then, the management server 500 sends all platform template records from the Platform Template Table 502-22, and the server list from the System Element Table 502-11, for which the "Element Type" fields is "server", and for which the "Element Id" value is not listed in the "Server Element Id" fields on the Server Profile Table 502-35.

At 1703, the administrator selects the platform template, and target servers from which the administrator plans to deploy the platform, and sends the platform deployment request to the management server 500.

At 1704, the management server 500 receives the platform deployment request. At 1705, the management server 500 creates the server profiles for the specified servers. Further detail of the flow at 1705 is disclosed with respect to FIG. 18.

At 1706, the management server 500 creates host storage profiles, and configures the SAN switches and storage systems. Further detail of the flow at 1706 is disclosed with respect to FIG. 19.

At 1707, the management server 500 applies the server profiles to the target servers, and installs the platform to the target servers. Further detail of the flow at 1707 is disclosed with respect to FIG. 20.

At 1708, the management server 500 creates the host network profile, and configures the LAN switches. Further detail of the flow at 1708 is disclosed with respect to FIG. 21.

At 1709, the results of the configuration are sent to the administrator.

Figure 18:
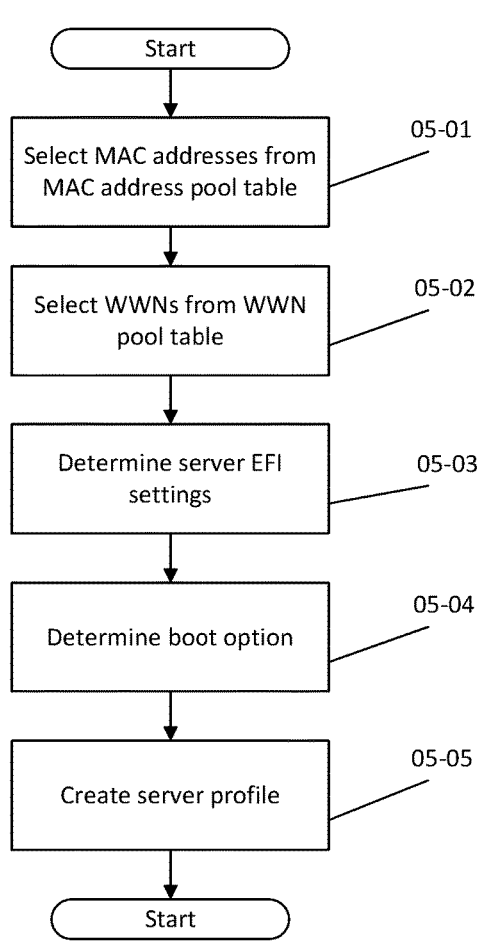
FIG. 18 is an example of a flow diagram illustrating the creation of the server profiles, in accordance with an example implementation.

FIG. 18 is an example of a flow diagram illustrating the creation of the server profiles, in accordance with an example implementation. The flow diagram described herein is directed to the flow at 1705 for FIG. 17.

At 05-01, the management server 500 picks up the MAC addresses for which the "Status" field value is "Not Assigned" from the MAC Address Pool Table 502-33 to each of the server LAN ports. Then, the management server 500 changes the "Status" field value from "Not Assigned" to "Assigned" for the selected MAC address records.

At 05-02, the management server 500 picks up the WWNs for which the "Status" field value is "Not Assigned" from the WWN Pool Table 502-33 to each of the server SAN ports. Then, the management server 500 changes the "Status" field value from "Not Assigned" to "Assigned" for the selected WWN records.

At 05-03, the management server 500 determines the model of the target servers from the System Element Table 502-11. Also, the management server 500 determines the platform type of the requested platform template from the Platform Template Table 502-22. Then, the management server 500 determines the server EFI settings according to the target server model and the platform type of the requested platform template from the Server EFI Setting Table 502-31.

At 05-04, the management server 500 determines the primary boot option of the target servers from the Boot Option Table 502-32 by using the platform type and platform option settings of the requested platform template. For example, if the administrator selects platform template #3 (Template Name: "High Available Virtualization Host"), the value of the "Boot Type" option in the "Platform Optional Settings" field is "Stateless". Then, the management server 500 determines the boot option "PXE Boot" using the Boot Option Table 502-32.

At 05-05, the management server 500 creates and stores the server profile with the "Platform Template Id" of the requested platform template, the "Server Element Id" of the target servers, the "MAC Address" picked at the flow at 05-01, the "WWN" picked at the flow at 05-02, the "Boot Option" determined at the flow at 05-04, and the "EFI settings" determined at the flow at 05-03 into the Server Profile Table 502-35.

Figure 19:
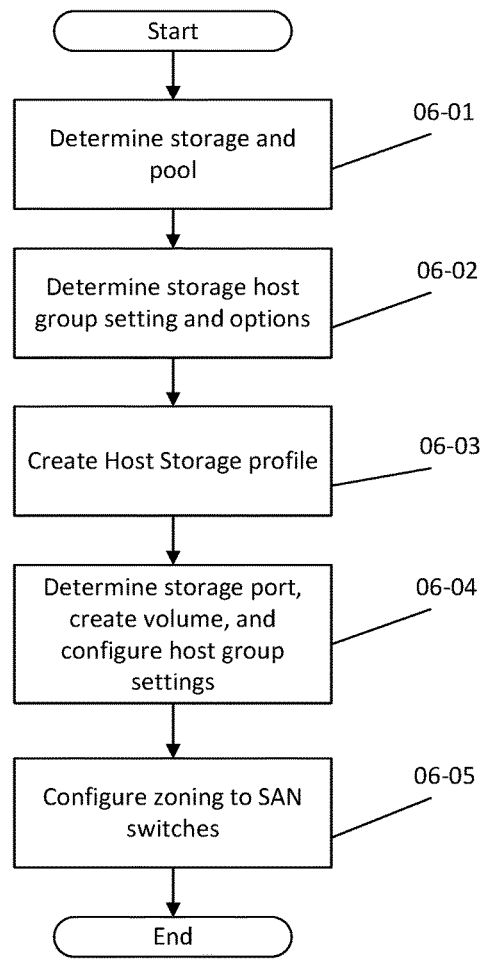
FIG. 19 is an example of a flow diagram illustrating the creation of the host storage profile, and configuring the SAN switch and storage, in accordance with an example implementation.

FIG. 19 is an example of a flow diagram illustrating the creation of the host storage profile, and configuring the SAN switch and storage, in accordance with an example implementation. The flow diagram corresponds to the flow at 1706 from FIG. 17.

At 06-01, the management server 500 determines the pool for each volume from the Storage Pool Table 502-42. According to the "Storage Volume" option setting in the platform optional settings of the requested platform template, the management server 500 determines the pool which supports the specified class, allows the platform type of the requested platform template, supports the requested storage volume option, and has sufficient free space. For example, if the administrator requests platform template #3 (Template Name: "High Available Virtualization Host"), then the required volume is one 500 GB volume with the "Gold" class, and the "Backup" feature support. Then, the management server 500 selects storage pool #1 (Pool Name: "SSD Pool Gold") which supports the "Gold" class, "Platform B", "Backup", and has more than 500 GB free space.

At 06-02, the management server 500 checks the "Storage Model" of the selected pool for each volume. Then, the management server 500 determines the record from the Storage Host Group Table 502-41, which matches the "Storage Model" of the selected pool, and supports the platform type and platform optional settings of the requested platform template and determines the storage host group settings and options.

At 06-03, the management server 500 creates and stores the host storage profile with the "Platform Template Id" of the requested platform template, "Server Profile Id" of the target servers, "Volume Size" of the volume in the platform optional settings of the requested platform template, "Class" of the volume in the platform optional settings of the requested platform template, "Storage Volume Options" of the volume in the platform optional settings of the requested platform template, "Storage Pool" of the selected pool for the volume in the flow at 06-01, "Host Group Setting" determined in the flow at 06-02, and "Host Group Optional Settings" determined in the flow at 06-02. The "Volume Id" field is determined and filled after creating volumes at the flow at 06-04.

At 06-04, the management server 500 determines the storage ports from which the target server sends/receives a network packet by using a predefined rule. For example, the predefined rule can be "selecting ports which are connected to different SAN Switches in each storage controller". For example, in the System Configuration in FIG. 1, according the predefined rule, the management server 500 selects four storage ports. The first port is storage port 1-1 or storage port 1-2 which connects to SAN Switch 1 in the Storage Controller 1. The second port is storage port 1-3 or storage port 1-4 which connects to SAN Switch 2 in the Storage Controller 1. The third port is storage port 2-1 or storage port 2-2 which connects to SAN Switch 1 in the Storage Controller 2. The fourth port is storage port 2-3 or storage port 2-4 which connects to SAN Switch 2 in the Storage Controller 2.

Then, the management server 500 creates volumes on the selected pool on the storage systems with the specified volume size, and options in the created host storage profile at the flow at 06-03. At this time, the management server 500 gets the Volume Ids from the storage system. The management server 500 updates the host storage profile with the Volume Ids.

Then, the management server 500 configures the host group setting and host group optional settings for the selected storage ports with WWNs of the server and target Volume IDs. The configuration allows the storage system to access from the server using the WWNs to the target volumes with the desired host group setting for the target platform type.

At 06-05, the management server 500 checks WWNs of the storage ports which are selected at 06-04. Then, the management server 500 configures the zoning setting for the SAN switches using the WWNs of the target servers and WWNs of the selected storage ports.

Figure 20:
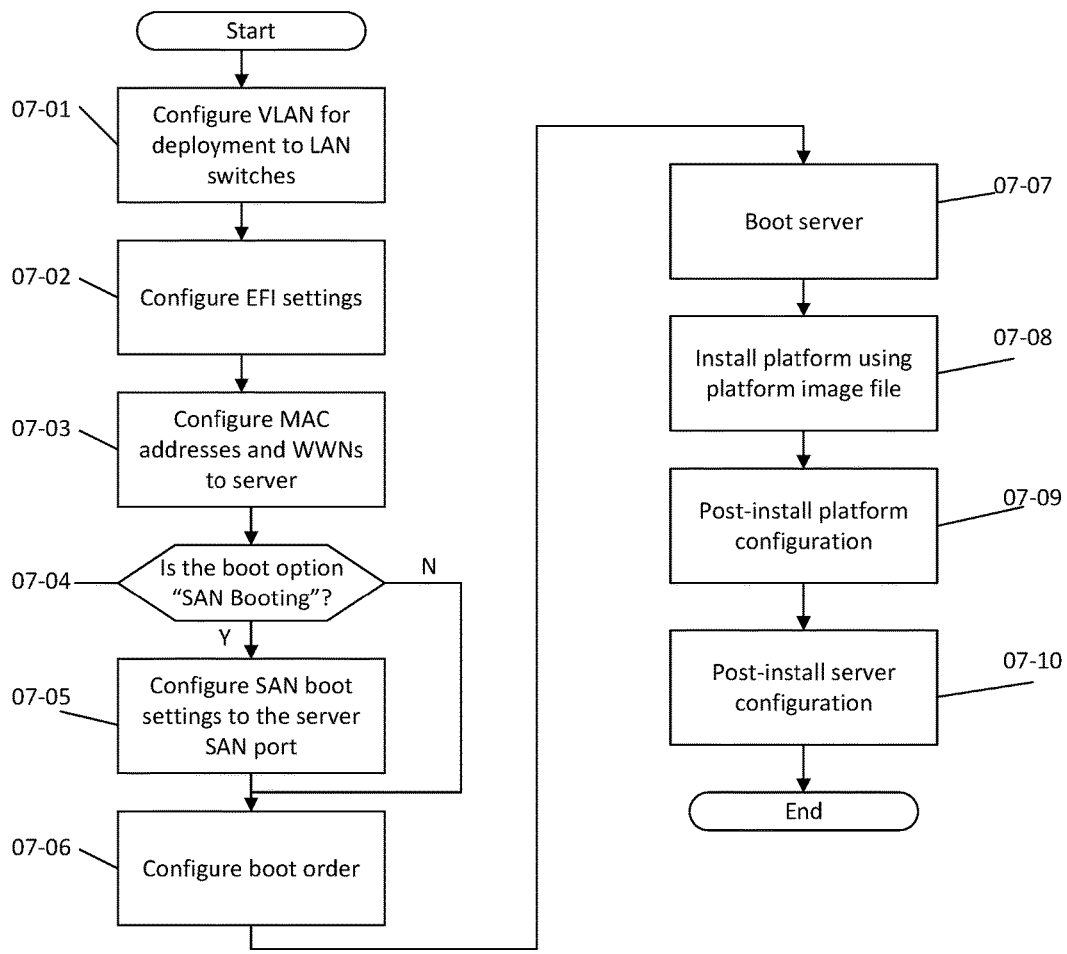
FIG. 20 is an example of a flow diagram for applying the server profile and installing the platform to the server, in accordance with an example implementation.

FIG. 20 is an example of a flow diagram for applying the server profile and installing the platform to the server, in accordance with an example implementation. The flow diagram corresponds to the flow at 1707 from FIG. 17.

At 07-01, the management server 500 configures the deployment of VLAN for the LAN switch ports which are connected to the target servers. This operation may be used, for example, if the network connectivity via the LAN switches between the target servers and the management server 500 is needed to install the platform.

At 07-02, the management server 500 configures EFI settings for the target servers according to the server profiles of each server.

At 07-03, the management server 500 configures the MAC addresses and WWNs for the target servers according to the server profiles of each server.

At 07-04, the management server 500 checks whether the "Boot Option" of the server profile is "SAN Boot" or not. If yes, then the flow proceeds to 07-05. If not, then the flow proceeds to 07-06.

At 07-05, the management server 500 configures SAN boot settings for the server SAN port. For example, the management server 500 configures WWNs of the storage ports which are determined at the flow at 06-04, and the Volume Id (Logical Unit Number (LUN) ID) of the boot volume.

At 07-06, the management server 500 configures the boot order to install the platform for the target servers. For example, if the management server 500 utilizes the PXE install method to install the platform, then the management server 500 configures the boot order of the server to force PXE booting.

At 07-07, the management server 500 boots the target servers.

At 07-08, the management server 500 installs the platform using the platform image file with the silent installation file.

At 07-09, the management server 500 does the post-install process of the platform configuration. For example, the management server 500 may register the target server into the Hypervisor Management 502-02.

At 07-10, the management server 500 does the post-install process of the server configuration. For example, the management server 500 may configure the boot order of the target server according to the "Boot Option" of the server profile.

Figure 21:
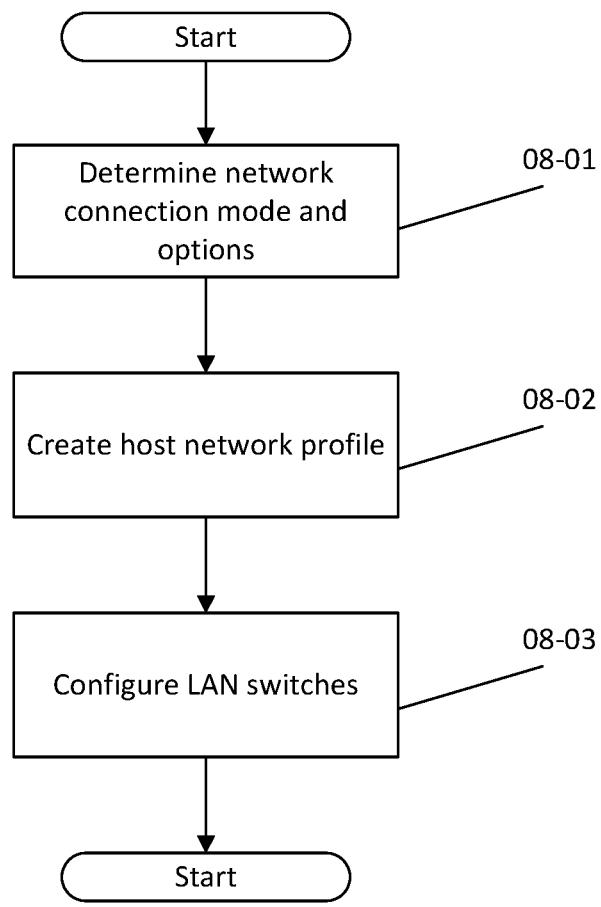
FIG. 21 is an example of a flow diagram for creating the host network profile, and configuring LAN switches, in accordance with an example implementation.

FIG. 21 is an example of a flow diagram for creating the host network profile, and configuring LAN switches, in accordance with an example implementation. The flow corresponds to the flow at 1708 from FIG. 17.

At 08-01, the management server 500 identifies the models of the LAN switches which are connected to the target servers. Then, the management server 500 determines the records of the Network Connection Mode Table 502-51 by using the models of the LAN switches, the platform type of the platform template, and the platform optional settings of the platform template.

At 08-02, the management server 500 creates and stores the host network profile with the "Platform Template Id" of the requested platform template, "Server Element Id" of the target servers, "VLAN Ids" specified in the platform template, "VLAN modes" determined from the flow at 08-01, "Priority" determined from the flow at 08-01, and "Virtual-Physical Network Sync" determined from the flow at 08-01.

At 08-03, the management server 500 configures the LAN switches and LAN switch ports which connected to the target servers according the host network profile.

Figure 22:
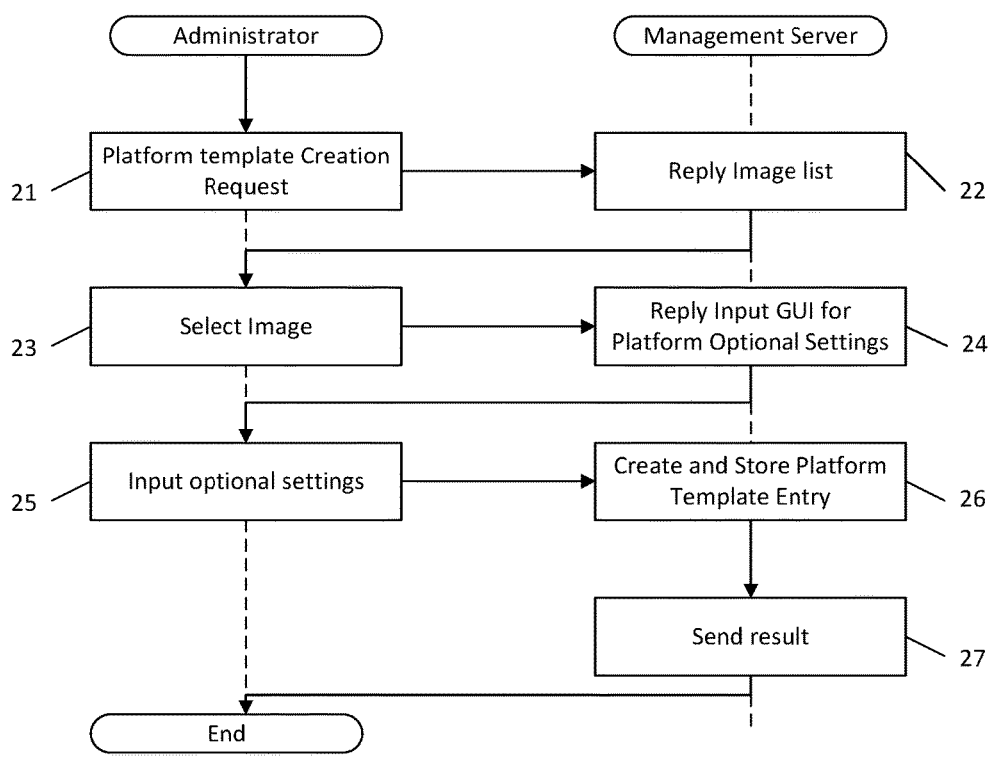
FIG. 22 illustrates a flow diagram for creating a platform template, in accordance with an example implementation.

FIG. 22 illustrates a flow diagram for creating a platform template, in accordance with an example implementation. At 21, the administrator issues a platform template creation request to the management server. At 22, the management server replies with a list of installation images for association with the platform template to the administrator. At 23, the administrator issues an image selection to the management server. At 24, the management server replies with an input Graphical User Interface (GUI) for incorporation of optional platform settings. At 25, the administrator issues the desired optional platform settings to the management server. At 26, the management server creates and stores the platform template and generates an entry in the platform template table 502-22. At 27, the management server indicates the result of the creation to the administrator.

Figure 23:
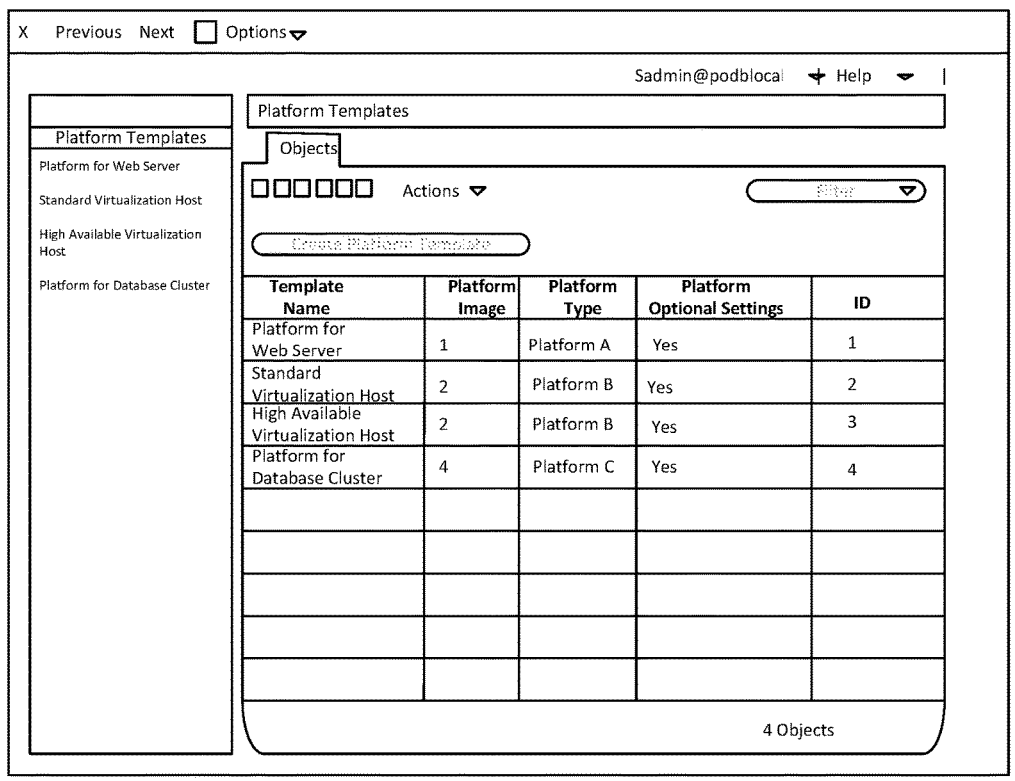
Figure 24:
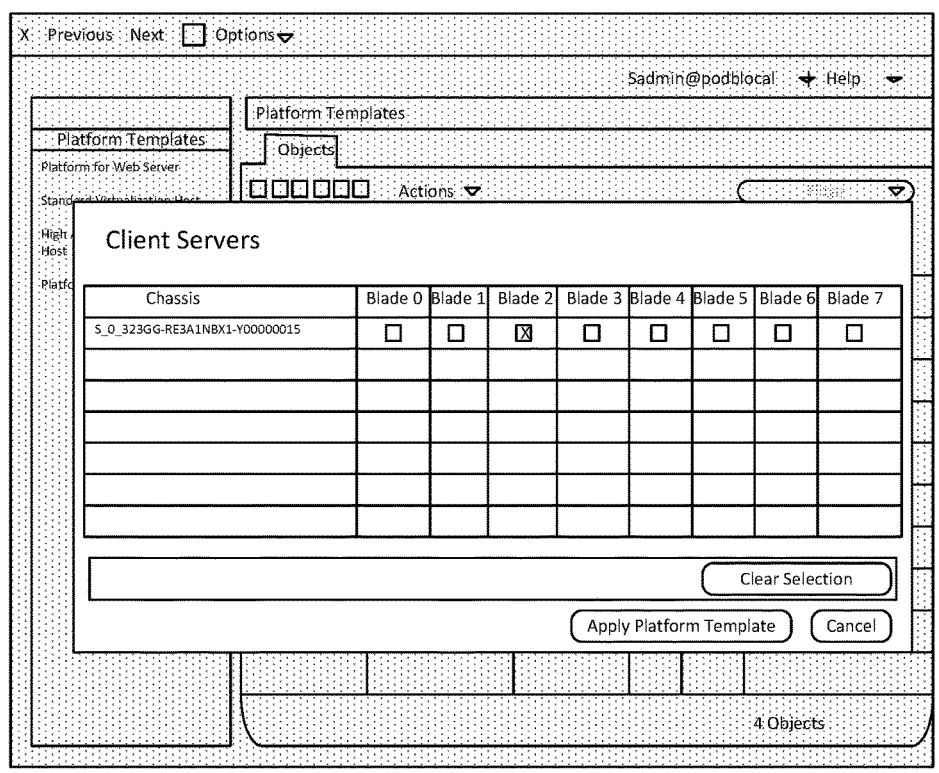

FIGS. 23 to 25 illustrate example graphical user interfaces (GUI), in accordance with an example implementation. The graphical user interface can be presented to the administrator by the management server. Specifically, the example GUI as depicted in FIG. 23 is directed to a listing of available platform templates for deployment. Each platform template can be associated with a platform image, a platform type, a name, and a record number. An example of information that can be displayed can be the information indicated in Platform Template Table 502-22. Additionally, an option to create an additional platform template can be implemented with a button or other interactive feature within the GUI. FIG. 24 illustrates an example GUI for a selection of a platform template. When a platform template is selected, a GUI can be presented to the administrator so that the administrator can select the server blade for deploying the platform template. FIG. 25 illustrates an example GUI for providing optional platform settings to the platform template. The configurable setting within the GUI can include one or more platform optional settings as described, for example, with respect to FIGS. 6 to 15.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a non-transitory medium or a storage medium, or a computer-readable signal medium. Non-transitory media or non-transitory computer-readable media can be tangible media such as, but are not limited to, optical disks, magnetic disks, read-only memories, random access memories, solid state devices and drives, or any other types of tangible media suitable for storing electronic information. A computer readable signal medium may any transitory medium, such as carrier waves. The algorithms and displays presented herein are not inherently related to any particular computer or other apparatus. Computer programs can involve pure software implementations that involve instructions that perform the operations of the desired implementation.

Various general-purpose systems and devices and/or particular/specialized systems and devices may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A management server configured to manage a plurality of computer devices, the management server comprising:
   a memory configured to store a plurality of templates, each of the plurality of templates indicative of a software that is executable by at least one server, and management information comprising a model of a type of element that configures each of the plurality of computer devices;
   a processor, configured to:
   create a computer device profile from a request comprising a selection of one of the plurality of templates and a selection of one of the plurality of computer devices based on the management information; and
   apply the computer device profile to the selected one of the plurality of computer devices to configure the selected one of the plurality of computer devices;
   wherein the memory further is further configured to store;
   a platform table configured to associate each of the plurality of templates with a platform type;
   a profile table for a plurality of types of elements, the profile table configured to provide a profile to a combination of the platform type and the model of the element that configures the each of the plurality of computer devices;
   wherein the processor is configured to create the computer device profile through;
      specifying a model for the plurality of types of elements that configures the selected one of the plurality of computer devices;
      specifying the platform type based on the platform table and the selected one of the plurality of templates; and
      obtaining the profile of the model based on the specified model, the specified platform type, and the profile table.

2. The management server of claim 1, wherein the computer device profile comprises a storage profile, the selection of the one of the plurality of devices comprising a server with an associated storage device; the storage profile comprising one or more settings configured to be applied to the associated storage device;
   wherein the processor is configured to create the computer device profile by creating the storage profile with the one or more settings configured to be applied to the associated storage device, the creating the storage profile comprising:
      selecting a storage pool for each volume specified by the selected one of the plurality of templates;
      selecting the associated storage device based on a model of a storage device associated with the selected storage pool for the each volume;
      creating the one or more settings configured to be applied to the associated storage device based on one or more settings in the selected one of the plurality of templates, the selected storage pool for the each volume, and the selected associated storage device.

3. The management server of claim 1, wherein the computer device profile comprises a network profile, the selection of the one of the plurality of devices comprising a server with an associated switch; the network profile comprising one or more settings configured to be applied to the associated switch; wherein the processor is configured to create the computer device profile by creating the network profile with the one or more settings configured to be applied to the associated switch, the creating the network profile comprising:
   creating the one or more settings configured to be applied to the associated switch based on a model of the associated switch and one or more settings from the selected one of the plurality of templates, the one or more settings configured to be applied to the associated switch being indicative of a network connection mode for the associated switch.

4. The management server of claim 1, wherein the computer device profile comprises a storage profile and a network profile, the selection of the one of the plurality of devices comprising a server with an associated storage system comprising a storage device and a switch, the computer device profile comprising settings configured to be applied to the associated storage system.

5. The management server of claim 2, wherein the computer device profile further comprises a server profile, the server profile comprising one or more settings configured to be applied to the selected server;
   wherein the processor is configured to create the computer device profile by creating the server profile with the one or more settings configured to be applied to the selected server, the creating the sever profile comprising:
      creating the one or more settings configured to be applied to the selected server, the one or more settings configured to be applied to the selected server comprising Extensible Firmware Interface (EFI) settings based on a model of the selected server and one or more settings from the selected one of the plurality of templates, and a boot option for the selected server specified from the selected one of the plurality of templates.

6. The management server of claim 3, wherein the computer device profile comprises a server profile, the server profile comprising one or more settings configured to be applied to the selected server;
   wherein the processor is configured to create the computer device profile by creating the server profile with the one or more settings configured to be applied to the selected server, the creating the sever profile comprising:
      creating the one or more settings configured to be applied to the selected server, the one or more settings including Extensible Firmware Interface (EFI) settings based on a model of the selected server and one or more settings from the selected one of the plurality of templates, and a boot option for the selected server specified from the selected one of the plurality of templates.

7. The management server of claim 1, wherein the plurality of devices comprises one or more servers.

8. The management server of claim 1, wherein the plurality of devices comprises one or more storage devices.

9. The management server of claim 1, software property is at least one of a software type and a software setting.

10. A non-transitory computer readable medium, storing instructions for executing a process for a management server configured to manage a plurality of computer devices, the instructions comprising:
    managing a plurality of templates, each of the plurality of templates indicative of a software that is executable by at least one server, and management information comprising a configuration policy for a set of:
    one or more of the plurality of devices and a software property;

creating a computer device profile from a request comprising a selection of one of the plurality of templates and a selection of one of the plurality of computer devices based on the management information; and applying the computer device profile to the selected one of the plurality of computer devices to configure the selected one of the plurality of computer devices;

managing a platform table configured to associate each of the plurality of templates with a platform type;

managing a profile table for a plurality of types of elements, the profile table configured to provide a profile to a combination of the platform type and the model of the element that configures the each of the plurality of computer devices;

wherein the creating the computer device profile further comprises:

specifying a model for the plurality of types of elements that configures the selected one of the plurality of computer devices;

specifying the platform type based on the platform table and the selected one of the plurality of templates; and obtaining the profile of the model based on the specified model, the specified platform type, and the profile table.

11. The non-transitory computer readable medium of claim 10, wherein the computer device profile comprises a storage profile, the selection of the one of the plurality of devices comprising a server with an associated storage device; the storage profile comprising one or more settings configured to be applied to the associated storage device;

wherein the creating the computer device profile comprises creating the storage profile with the one or more settings configured to be applied to the associated storage device, the creating the storage profile comprising:

selecting a storage pool for each volume specified by the selected one of the plurality of templates;

selecting the associated storage device based on a model of a storage device associated with the selected storage pool for the each volume;

creating the one or more settings configured to be applied to the associated storage device based on one or more settings in the selected one of the plurality of templates, the selected storage pool for the each volume, and the selected associated storage device.

12. The non-transitory computer readable medium of claim 10, wherein the computer device profile comprises a network profile, the selection of the one of the plurality of devices comprising a server with an associated switch; the network profile comprising one or more settings configured to be applied to the associated switch;

wherein the creating the computer device profile comprises creating the network profile with the one or more settings configured to be applied to the associated switch, the creating the network profile comprising:

creating the one or more settings configured to be applied to the associated switch based on a model of the associated switch and one or more settings from the selected one of the plurality of templates, the one or more settings configured to be applied to the associated switch being indicative of a network connection mode for the associated switch.

13. The non-transitory computer readable medium of claim 11, wherein the computer device profile further comprises a server profile, the server profile comprising one or more settings configured to be applied to the selected server;

wherein the creating the computer device profile comprises creating the server profile with the one or more settings configured to be applied to the selected server, the creating the sever profile comprising:

creating the one or more settings configured to be applied to the selected server, the one or more settings configured to be applied to the selected server comprising Extensible Firmware Interface (EFI) settings based on a model of the selected server and one or more settings from the selected one of the plurality of templates, and a boot option for the selected server specified from the selected one of the plurality of templates.

14. A method for managing a plurality of computer devices, the method comprising:

managing a plurality of templates, each of the plurality of templates indicative of a software that is executable by at least one server, and management information comprising a configuration policy for a set of:

one or more of the plurality of devices and a software property;

creating a computer device profile from a request comprising a selection of one of the plurality of templates and a selection of one of the plurality of computer devices based on the management information; and applying the computer device profile to the selected one of the plurality of computer devices to configure the selected one of the plurality of computer devices;

managing a platform table configured to associate each of the plurality of templates with a platform type;

managing a profile table for a plurality of types of elements, the profile table configured to provide a profile to a combination of the platform type and the model of the element that configures the each of the plurality of computer devices;

wherein the creating the computer device profile further comprises:

specifying a model for the plurality of types of elements that configures the selected one of the plurality of computer devices;

specifying the platform type based on the platform table and the selected one of the plurality of templates; and obtaining the profile of the model based on the specified model, the specified platform type, and the profile table.

* * * * *